United States Patent
Wang et al.

(10) Patent No.: US 8,045,522 B2
(45) Date of Patent: Oct. 25, 2011

(54) METHOD AND SYSTEM FOR PERFORMING HANDOFF IN WIRELESS NETWORKS

(75) Inventors: Limei Wang, San Diego, CA (US); Leo Anderson, Jr., Raymore, MO (US)

(73) Assignee: FutureWei Technologies, Inc., Plano, TX (US)

( * ) Notice: Subject to any disclaimer, the term of this patent is extended or adjusted under 35 U.S.C. 154(b) by 1004 days.

(21) Appl. No.: 11/861,259

(22) Filed: Sep. 25, 2007
(Under 37 CFR 1.47)

(65) Prior Publication Data

US 2008/0225793 A1 Sep. 18, 2008

Related U.S. Application Data

(60) Provisional application No. 60/863,315, filed on Oct. 27, 2006, provisional application No. 60/866,268, filed on Nov. 17, 2006.

(51) Int. Cl.
*H04W 4/00* (2009.01)
(52) U.S. Cl. .......................... 370/331; 455/436
(58) Field of Classification Search ............... 370/252, 370/310, 331, 328, 338, 329, 352, 394; 455/403, 455/422.1, 436
See application file for complete search history.

(56) References Cited

U.S. PATENT DOCUMENTS

| | | | | |
|---|---|---|---|---|
| 7,068,669 B2 * | 6/2006 | Abrol et al. | ............ | 370/401 |
| 7,139,574 B2 * | 11/2006 | Chang | ............ | 455/436 |
| 7,349,328 B2 * | 3/2008 | Watanabe | ............ | 370/218 |
| 7,860,067 B2 * | 12/2010 | Na et al. | ............ | 370/338 |
| 2005/0076244 A1 * | 4/2005 | Watanabe | ............ | 713/201 |
| 2006/0077932 A1 * | 4/2006 | Takeda et al. | ............ | 370/331 |
| 2007/0291717 A1 * | 12/2007 | Williams et al. | ............ | 370/338 |

OTHER PUBLICATIONS

"3$^{rd}$ Generation Partnership Project 2 "3GPP2"; Fast Handoff Call Flows with Separate HA Addresses for PMIP and CMIP," TSG-X, Nortel Networks, published prior to Oct. 27, 2006, 5 pages.
"3$^{rd}$ Generation Partnership Project 2 "3GPP2"; HRPD Fast Handoff Call Flows," TSG-X Lucent Technologies, published prior to Oct. 27, 2006, 12 pages.
"3$^{rd}$ Generation Partnership Project 2 "3GPP2"; Fast Handoff for HRPD," TSG-X (CSN), X.P0043, published prior to Oct. 27, 2006, 46 pages.
"3$^{rd}$ Generation Partnership Project 2 "3GPP2"; Fast Handoff for HRPD," TSG-X (CSN), X.P0043, published prior to Oct. 27, 2006, 46 pages. (Revised Version).

* cited by examiner

*Primary Examiner* — Chi Pham
*Assistant Examiner* — Weibin Huang
(74) *Attorney, Agent, or Firm* — Slater & Matsil, L.L.P.

(57) ABSTRACT

Method and system for performing handoff in wireless networks. According to an embodiment, the present invention provides a method for wireless communication. The method includes providing an access terminal that is configured to perform wireless IP communication. The method also includes providing a first wireless connection for the access terminal by a first access node. The method further includes providing a first network access for the access terminal by a first connectivity node. Additionally, the method includes obtaining a plurality of addresses for the access terminal. The plurality of address includes a first address and a second address. The first address is associated with a first priority level. The second address is associated with a second priority level. The method additionally includes storing the plurality address by a home agent. The method also includes initiating a handoff process for switching from the first connectivity node to a second connectivity node.

21 Claims, 3 Drawing Sheets

METHOD AND SYSTEM FOR PERFORMING HANDOFF IN WIRELESS NETWORKS

CROSS-REFERENCES TO RELATED APPLICATIONS

This application claims priority to U.S. Provisional Patent Application No. 60/863,315, filed Oct. 27, 2006, and U.S. Provisional Patent No. 60/866,268, filed Nov. 17, 2006, both of which are incorporated by reference herein for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to telecommunication techniques. More particularly, the invention provides a method and system for performing handover in a wireless communication network. In a specific embodiment, the present invention provides a method and system for a single home agent to establish two or more sessions for an access terminal based on the respective priority levels. Merely by way of example, the invention is described as it applies to Mobile IP wireless communication network, but it should be recognized that the invention has a broader range of applicability.

In the past decade, communication technologies rapidly developed. Various communication mediums have been explored, ranging from power line, telephone line, optical line, to wireless communication. Most recently, wireless communication has become more and more popular and widely adopted for the convenience that it offers.

Wireless communication has many applications. Among other things, mobile phones that utilize wireless communication techniques are one of the most popular communicational devices, who claim billions of users today. Another popular application using wireless communication devices is mobile computing devices accessing local networks via wireless links. Through the local wireless networks, mobile computing devices are able to connect to the Internet using wireless internet protocol (IP) technology. Most recently, standard setting organizations such as the Internet Engineering Task Force (IETF) and Institute of Electrical and Electronics Engineers (IEEE) have developed and promoted various standards for wireless communication networks. For example, the IETF has developed a Mobile IP standard, which is a communications protocol that is designed to allow mobile device users to move from one network to another while maintaining a permanent IP address.

A mobile home address can be associated with multiple CoA so that the Mobile may have different path route with delivery QoS and latency. The binding of home address with CoA happens at Home Agent (HA). However, the conventional techniques cannot differentiate the different bindings at a single HA to ensure the QoS during the handoff and reduce the latency.

Therefore, an improved system and method for performing handover is desired.

BRIEF SUMMARY OF THE INVENTION

The present invention relates in general to telecommunication techniques. More particularly, the invention provides a method and system for performing handover in a wireless communication network. In a specific embodiment, the present invention provides a method and system for a single home agent to establish two or more sessions for an access terminal based on the respective priority levels. Merely by way of example, the invention is described as it applies to Mobile IP wireless communication network, but it should be recognized that the invention has a broader range of applicability.

According to an embodiment, the present invention provides a method for wireless communication. The method includes providing an access terminal that is configured to perform wireless IP communication. The method also includes providing a first wireless connection for the access terminal by a first access node. The method further includes providing a first network access for the access terminal by a first connectivity node. Additionally, the method enables the system to obtain a plurality of addresses associated with the access terminal for routing the packets to the access terminal. The plurality of address includes a first address and a second address. The first address is associated with a priority level. The second address is associated with a different priority level other than the first priority level. The method additionally includes storing the plurality address with the priority level by a home agent. The method also includes initiating a handoff process for switching from the first connectivity node to a second connectivity node. In addition, based on the type of the applications, the method includes determining the better route based on the priority level by the home agent. The method further includes performing a first binding update for the first address between the home agent and a first access node. The method also includes performing a second binding update for the second address between the home agent and the access terminal. Moreover, the method includes providing a second network access for the access terminal by a second connectivity node.

According to another embodiment, the present invention provides a method for a handoff process in a wireless communication network. The method includes providing an access terminal, the access terminal being configured to perform wireless IP communication. The method also includes providing a first network access for the access terminal by a first connectivity node and a first access node. The method further enables the system to obtain a plurality of addresses associated with the access terminal for routing the packets to the access terminal. The plurality of address includes a first address and a second address. The first address is associated with a priority level. The second address is associated with a different priority level other than the first priority level. The method additionally includes storing the plurality address with their priority level by a home agent. The method additionally includes performing a handoff process for switching from the first connectivity node to a second connectivity node. The handoff process includes determine which address will be used for routing the packets based on the priority level associated with the address and the application type by the home agent. The process also includes performing a first binding update for the first address between the home agent and a first access node. The process further includes performing a second binding update for the second address between the home agent and the access terminal. The process additionally includes initiating a timer by the second connectivity node. The process also includes sending a handoff acknowledge message from the second connectivity node to the first connectivity node if a handoff confirm message is not received by the second connectivity node before an expiration of the timer.

According to yet another embodiment, the present invention provides a system for wireless communication. The system provides an access terminal, the access terminal being configured to perform wireless IP communication. The system additionally provides a first access node, the first access node being configured for providing a first wireless connection for the access terminal. The system additionally includes a first connectivity node for providing a first network access for the access terminal. The system further includes a home agent, the home agent being configured to store a plurality of addresses with a priority level for the access terminal associated with the access terminal home address, the plurality of address including a first address and a second address, the first address being associated with a priority level, the second address being associated with a different priority level. The access node is configured to initiate a handoff process for switching from the first connectivity node to a second connectivity node. The home agent is configured to determine which address will be used for routing the packets based on the priority level associated with the address and the application type by the home agent, the first priority level being higher than the second priority level. The home agent is configured perform a first binding update for the first address with the first access node. The home agent is configured to perform a second binding update for the second address with the access terminal. The second connectivity node is configured to provide a second network access for the access terminal.

Many benefits are achieved by way of the present invention over conventional techniques. In certain embodiments, the present invention provides a process for performing handoff where two or more addresses are involved. More specifically, each of the addresses is associated with a priority level. A home agent, when performing binding updates, through different communication links and processes to ensure that handoff for communication links of real time applications (e.g., VoIP applications) is performed reliably and timely. Among other things, embodiments of the present application ensure the quality of services of various types of applications. In various embodiments, the binding updates for multiple addresses are performed using a single home agent, which allows for efficient and cost-effective implementation. In addition, various embodiments of the present invention may be implemented in conjunction of existing systems. There are other advantages and benefits as well.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
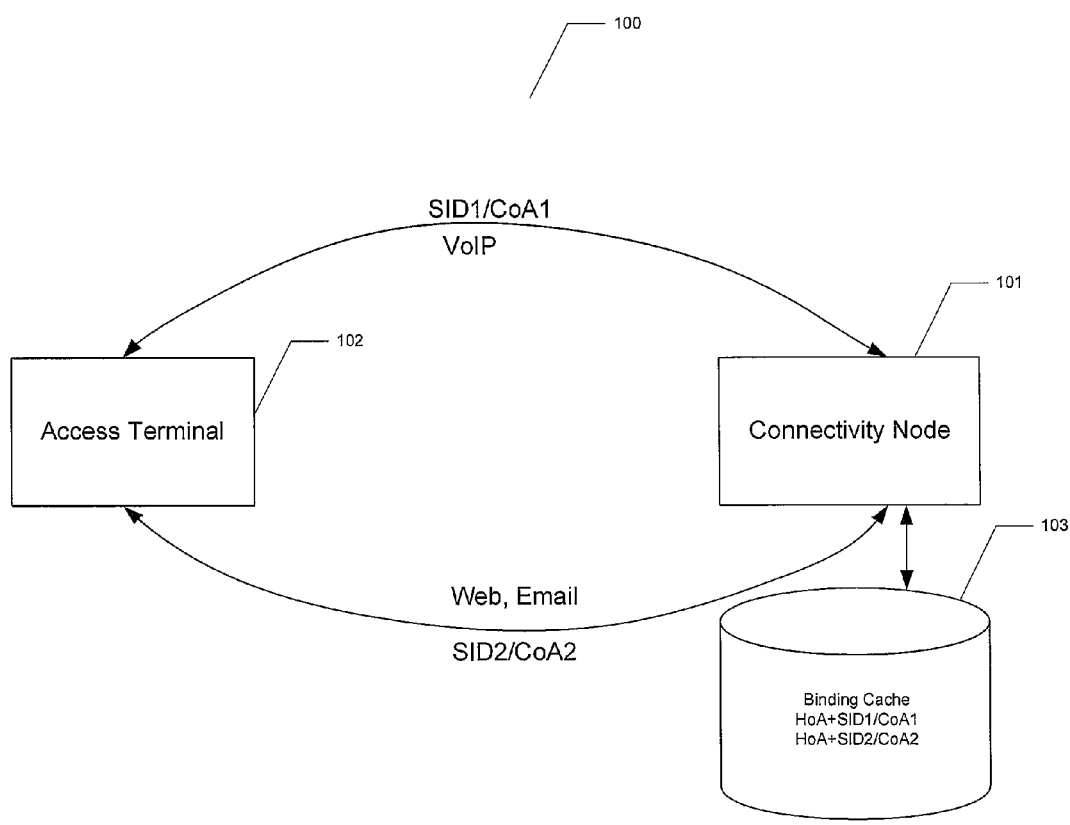
FIG. 1 is a simplified diagram illustrating a mechanism for indicating priority values according to an embodiment of the present invention.

The present invention relates in general to telecommunication techniques. More particularly, the invention provides a method and system for performing handover in a wireless communication network. In a specific embodiment, the present invention provides a method and system for a single home agent to establish two or more sessions for an access terminal based on the respective priority levels. Merely by way of example, the invention is described as it applies to Mobile IP wireless communication network, but it should be recognized that the invention has a broader range of applicability.

The Mobile IP standard, among other things, is designed to maintain its connectivity while moving from one network to another. For example, the standard is adopted in 3G CDMA networks as a way to maintain connectivity when the mobile node moves from one packet data service node to another. For smooth transition, a handover process is performed. Typically, this handover procedure requires not only movement detection, but also acquiring a new care-of address and sending a binding update message to a home agent before traffic begins to direct to a new location.

Depending on the application, conventional handover techniques are often inadequate. Among other things, the process of acquiring new CoA that is used by mobile IP may be too slow for certain applications. For example, the conventional techniques may not be allowed for a real time application such as Voice over IP (VoIP). Therefore, there is a need to provide a system for fast handover with delayed context transfer during the handoff in order to reduce latency and packet loss, and also solve the "handoff never complete" problem.

For different kind of services with different kind of quality requirement support, a mobile device may have multiple active sessions initiated simultaneously such as it may have both proxy mobile IP (PMIP) session and client mobile IP (CMIP) session set up. According to conventional techniques, when two or more sessions are supported simultaneously by the same HA, the HA cannot differentiate which CoA is the best route for a particular type of services.

According to various embodiments, the present invention solves this problem by using Care of Address Priority (CoAP). More specifically, if a mobile node registers a binding with priority value, the priority information can be used by the Home Agent to select a binding. In addition, the desired binding can also be selected with policy and filter information. Among other things, embodiments of the present invention allows for better QoS, multi-homing, redundancy, fault tolerance.

According to an embodiment, a priority value field is used to indicate the type of services and respective session. As such, the CoAP value that allows the selection for the best CoA for the type of the services. For example, the CoAP may be assigned by the HA or PDSN. It may also be an indication of the PMIP or the CMIP. For example, the priority value format itself can be any format. In such case, the binding cache would looks like:

| Binding Cache |
|---|
| HoA, CoA1, CoAP1 |
| HoA, CoA2, CoAP2 |

FIG. 1 is a simplified diagram illustrating a mechanism for indicating priority values according to an embodiment of the present invention. This diagram is merely an example, which should not unduly limit the scope of the claims. One of ordinary skill in the art would recognize many variations, alternatives, and modifications. As illustrated in FIG. 1, an access terminal 102 is connected to a connectivity node 101. For example, the connectivity node includes a base station and a binding cache 103. The binding cache 103 is configured to store various information associated with the connected sessions of the access terminal 102. For example, a first session SID1, which is associated with a first CoA, for the access terminal 102 is for VoIP communication, which requires essentially real time network reliability and performance. The second session SID2, which is associated with a second CoA, for the access terminal 102 is for data communication (e.g., web, email, etc.) that is bursty. The first session and the second session are identified by different priority values. According to an embodiment, each of the session SID is associated with session priority (SPRI) value. For example, the connectivity node 101 is configured to use the session priority value to select CoA.

Figure 2:
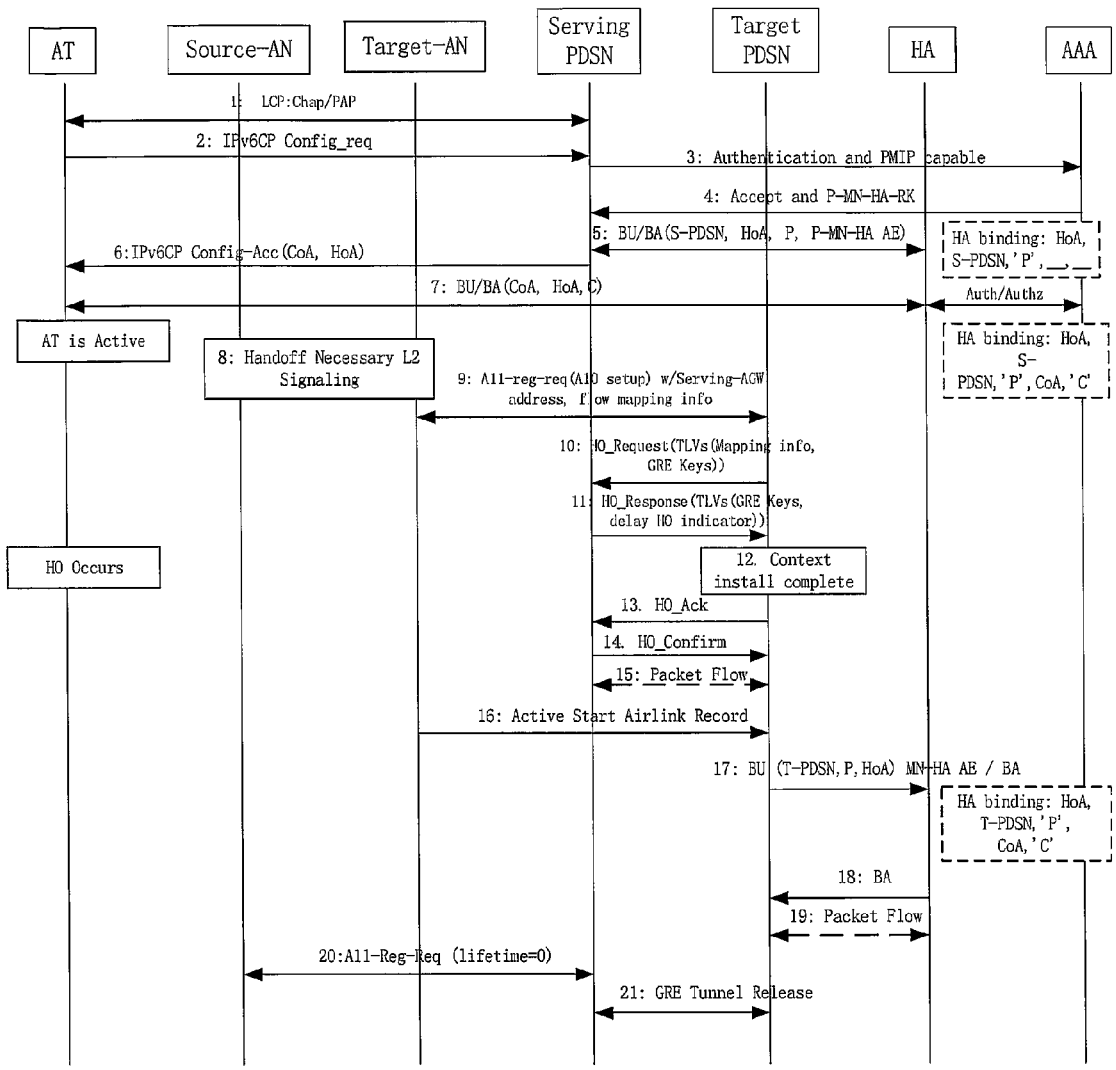
FIG. 2 is a simplified diagram illustrating an handoff process according to an embodiment of the present invention.

FIG. 2 is a simplified diagram illustrating a handoff process according to an embodiment of the present invention. This diagram is merely an example, which should not unduly limit the scope of the claims. One of ordinary skill in the art would recognize many variations, alternatives, and modifications. For example, various steps may be added, removed, replaced, rearranged, modified, repeated, and/or overlapped. Among other things, the example shows how CoA priority can solve the problem of multiple CoA (e.g., CoA for CMIP and PMIP) concurrent under a single HA for the fast handoff with delayed context transfer. For example, the HA may use the session ID, packet flow ID, service flow ID or other indications which may indicate a QoS requirement to select the CoA based on the CoA priority associated with it.

At step 1, a connection is established for an access terminal. For example, the access terminal may be a mobile station, a cellular phone, a portable computing device, etc. According to an embodiment, the access terminal is connected to a serving packet data serving node (PDSN). For example, the connection between the AT and the serving PDSN is a layer 2 connection. According to a specific embodiment, the AT indicates to the serving PDSN that the AT is capable of connecting to multiple network session using different CoAs.

At step 2, the AT sends a configuration request to the serving PDSN. For example, the request is in compliance with the IPv6CP standard.

At step 3, an authorization request is sent from the serving PDSN to the authentication, authorization, and accounting (AAA) server. Among other things, serving PDSN indicates to AAA that the it is compatible with the PMIP protocol.

At step 4, the AAA server creates a network key in response to the authorization request sent from the serving PDSN. The AAA server sends the key to the serving PDSN for proxy MN-HA authentication (e.g., PMN-HA-RK).

At step 5, binding update is performed for between the serving PDSN and the home agent (HA). For example, the binding update performed between the PDSN and the HA is through a direct connection, thereby minimizes the communication overhead and allows for reliable and fast handoff, which is suited for real time network services such as VoIP services. According to an embodiment, the binding update is performed after the serving PDSN has already established a security association (SA) with the HA. For example, after the serving PDSN establishes an SA with the HA, the serving PDSN sends a PMIP Binding Update (BU) to the HA. This Binding Update includes an AE using the key derived from PMN-HA-RK, and also a CoA priority indication. For example, the designation of "P" is associated with a high priority level and PMIP binding. The BU is used to bind the serving PDSN with HoA with the priority information indicating that it is for proxy mobile IP. For example, the PMIP has a high priority, which is used for real time services. The HA responds with BA to the serving PDSN and includes HoA.

At step 6, the serving PDSN sends a configuration response to the AT. Among other things, the response includes the HoA and the CoA network prefix that is specific to the AT.

At step 7, a binding update is performed between the AT and the HA. According to an embodiment, during the binding update process, the AT indicates a priority level to the HA. For example, the AT provides a CoA address for the CMIP that has a lower priority level compared to the CoA for PMIP. The HA stores both the CoA and the priority level as indicated. In a specific embodiment, the priority level is indicated by a designation of "C" to indicate the CMIP and it could be associated with non-real time applications For example, the data traffic includes web data, emails, etc. As show in FIG. 2, the communication between the AT and the HA is not direct. Depending on the application, the communication between the AT and the HA may go through one or more entities, such as the serving PDSN, source AN, etc. The binding update for CMIP has to be sent from AT and go through the air such that introduce greater delay. As a result, the binding process between the AT and the HA is not as fast as that between the PDSN and the HA.

According to various embodiments, the HA includes a binding cache that is configured to store, among other things, CoAs and priority information associated with the AT. For example, each of the CoA stored at the HA includes the priority information associated with the CoA. In an exemplary embodiment, the HA is configured to determine how the binding update is performed based on the priority information. The HA determines that direct binding processes are to be performed with high priority sessions. In contrast, sessions demanding less time sensitivity are connected through additional network entities.

At step 8, the source access node determines whether a handoff process is needed for the AT to switch from the source access node to a target access node. Depending on the application, the determination may be based on a variety of factors. For example, Inter AN signaling takes place to transfer HRPD session information including the identity of the serving PDSN.

At step 9, the target AN determines that the serving PDSN is unreachable from it's network link. The target AN selects a target PDSN and sends an A11-reg-request to setup the A10 link(s) for the handoff session that is to be performed. For example, the information contained in the A11-reg-request message includes the Flow_id to A10 mapping information and the S-PDSN address.

At step 10, the target PDSN sends a HO_Request message to the serving PDSN. According to an embodiment, the HO-Request message includes GRE key. For example, the message is sent to a default port 699 (same port as used for A11 signaling). The target PDSN includes a list of Context_IDs for the contexts that it requests the S-PDSN to transfer. The HO-Request message is formatted with NVSEs carrying the context information.

At step 11, the serving PDSN responds to the HO_Request message with an HO_Response message to the target PDSN. The HO_Response message includes the requested context information indicated by the serving PDSN. For example, the message includes the GRE keys of the serving PDSN and an indication that it is associated with a delayed handoff. At the end of step 11, a GRE tunnel corresponding to each A10 is created among the PDSNs.

At step 12, the target PDSN completes the context installation process using the information from the serving PDSN.

At step 13, when the target PDSN has completed the installation of the context sent from the serving PDSN and the target PDSN is ready to begin processing packets, the target PDSN sends the HO_Ack message to the serving PDSN.

At step 14, the serving PDSN sends a HO_Confirm message to the target PDSN, regardless of whether the serving PDSN needs to send raw packets through the target PDSN, which is after that the serving PDSN receiving the HO_Ack message. The HO_Confirm message uses a generic protocol message format. For example, the HO_Confirm message carries Function Type of 1 (FHO) and Message Type 4. According to embodiments, the message is sent from the serving PDSN to the target PDSN. Among other things, this message confirms that the serving PDSN has received the HO_Ack message from target PDSN.

The HO_confirm message is also used to allow the target PDSN to efficiently allocate resources. The serving PDSN sends a received status indication included in the HO_Ack message to the target PDSN. If the target PDSN receives the HO_Confirm message, it may set an internal timer off and wait for the data packets from serving PDSN. On the other hand, if the target PDSN does not receive the HO_Confirm message and does not receive the raw packet from serving PDSN after the internal timer expired, the serving PDSN may re-send the HO_Ack message to the serving PDSN and re-start the internal timer. In certain situations, the process of sending HO_Ack and HO_confirm may be repeated several times until the target PDSN receives the HO_Confirm message or raw packet from serving PDSN.

At step 15, the target PDSN begins performing data communication for the AT. Once the serving PDSN decides it is time to complete the handoff process, the packet processing responsibility is delegated to the target PDSN. In an embodiment, to trigger the handoff completion, the serving PDSN sends the remaining processed packets and begins sending raw IP packets to the target PDSN.

At step 16, the target AN acquires the AT. For example, the target AN sends a message (e.g., Airlink Start) to the target PDSN. For example, process begins when the target AN begins serving the AT.

At step 17, a PMIP binding update is performed for the target PDSN to the HA. The binding update includes a priority indication. For example, the priority "p" designation indicates to the HA that a high priority level is associated with the binding update. For example, the binding for the target PDSN with the HoA.

At step 18, the HA sends a binding acknowledgement to the target PDSN.

At step 19, a tunnel switch process is performed. The HA switches the tunnel from the serving PDSN to the target PDSN. For example, the forward data traffic are routed to the AT tunneled from HA over the target PDSN using routing header option. Similarly, the outgoing data are from the AT to the other networks (e.g., the internet).

At step 20, the A10 connection is released. For example, the A11 signaling between the Source AN and S-PDSN is used to tear down the old A10 connections.

At step 21, the GRE tunnel release is performed. According to embodiments, the P-P tunnel is automatically torn down by timeout of the lifetime negotiated during the P-P tunnel setup in steps 10 and 11. In an alternate embodiment, the target PDSN may send a HO_Request to the serving PDSN with lifetime=0 to explicitly break down the P-P tunnel. For example, the MS is not affected by the change of PDSN.

Figure 3:
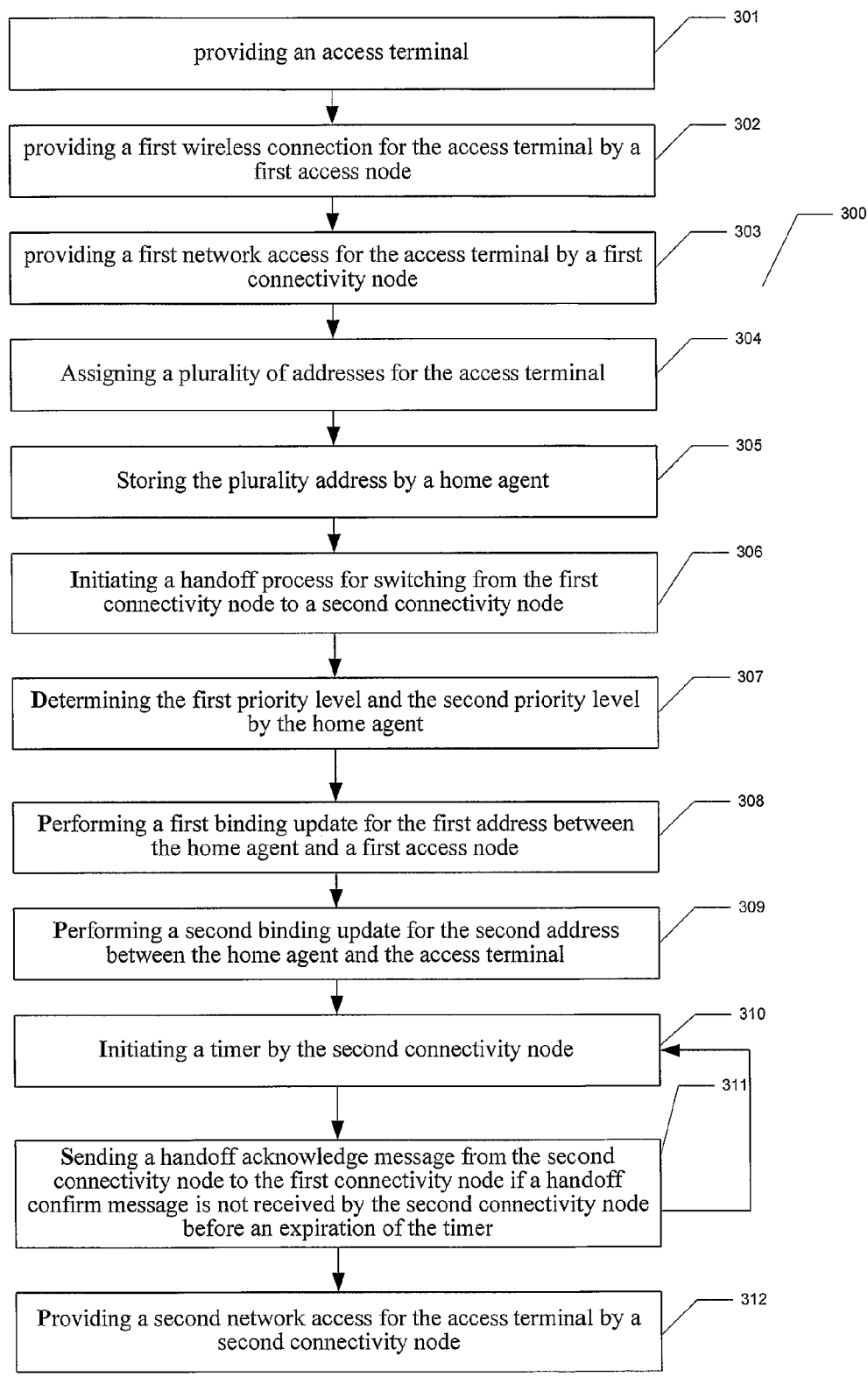
FIG. 3 is a simplified diagram illustrating an alternative embodiment of the present invention.

FIG. 3 is a simplified diagram illustrating an alternative embodiment of the present invention. This diagram is merely an example, which should not unduly limit the scope of the claims. One of ordinary skill in the art would recognize many variations, alternatives, and modifications. For example, various steps may be added, remove, replaced, modified, repeated, rearranged, and/or overlapped.

As shown, the a process 300 includes the following steps:

Providing an access terminal (301). For example, the access terminal is configured to perform wireless IP communication in accordance to the Mobile IP standard.

Providing a first wireless connection for the access terminal by a first access node (302). For example, the access node includes a base station for providing wireless access.

Providing a first network access for the access terminal by a first connectivity node (303). The connectivity node, among other things, is configured to various types of network access, such as data network, Assigning a plurality of addresses for the access terminal (304). According to embodiments, the plurality of address includes a first address and a second address. The first address is associated with a first priority level. The second address is associated with a second priority level. The first address and the second address are both care-of-address. For example, the first address is a CoA associated with PMIP, which is relatively more stable than CMIP. The first address is used for network applications that require a high level of reliability and performance, usually in real time. The second address is a CoA associated with CMIP, and is used for data applications that, which often use a relatively larger amount of bandwidth in burst. For example, the communication through the CMIP does not require real time reliability as required for real time applications.

Storing the plurality address by a home agent (305). According to embodiments, the home agent includes a binding cache for storing information. Depending on the application, the home agent may also provide wireless access to the access terminal.

Initiating a handoff process for switching from the first connectivity node to a second connectivity node (306). Depending on the application, a handoff process may be initiate in various ways for different reasons. For example, the access node may detect a change of access terminal's location. As another example, the access terminal may send a location update message to the home agent to indicate that a new location that prompts for a handoff process.

Determining the first priority level and the second priority level by the home agent (307). Depending on the application, the priority level may be based on a variety of factors, such as the type of information being transmitted, the type of service, etc. For example, the home agent determines the priority level using information stored in the binding cache. As merely an example, the first priority level is higher than the second priority level.

Performing a first binding update for the first address between the home agent and a first access node (308). According to an embodiment, the first address is determined to have higher priority (e.g., associated PMIP and used for real time network applications), and the binding update is performed directly between the home agent and the access node, without having to go through the access terminal and/or other entities in the network. As a result, the direct binding update has minimal affect to the on going call and causes only a small amount of interruption.

Performing a second binding update for the second address between the home agent and the access terminal (309). According to an embodiment, the first address is determined to have lower priority (e.g., associated CMIP and used for non-real time network applications). The binding update is performed between the home agent and the access terminal through one or more network entities (e.g., access nodes).

Initiating a timer by the second connectivity node (310). For example, the second connectivity node is a target PDSN. The second connectivity node initiates the timer to ensure that the handoff process is properly performed.

Sending a handoff acknowledgement message from the second connectivity node to the first connectivity node if a handoff confirm message is not received by the second connectivity node before an expiration of the timer (311). For example, the handoff acknowledgement message is sent if the timer expires without receiving a confirmation message from the first connectivity node. According to an embodiment, the second connectivity node resends the handoff acknowledge message and restart the timer, and the process repeats until a handoff confirm message is received.

Providing a second network access for the access terminal by a second connectivity node (312). Once the handoff process is completed, the second connectivity takes over the network routing activities from the first connectivity node.

According to an embodiment, the present invention provides a method for wireless communication. The method includes providing an access terminal that is configured to perform wireless IP communication. The method also includes providing a first wireless connection for the access terminal by a first access node. The method further includes providing a first network access for the access terminal by a first connectivity node. Additionally, the method includes obtaining a plurality of addresses for the access terminal. The plurality of address includes a first address and a second address. The first address is associated with a first priority level. The second address is associated with a second priority level. The method additionally includes storing the plurality address by a home agent. The method also includes initiating a handoff process for switching from the first connectivity node to a second connectivity node. In addition, the method includes determining the first priority level and the second priority level by the home agent, the first priority level being higher than the second priority level. The method further includes performing a first binding update for the first address between the home agent and a first access node. The method also includes performing a second binding update for the second address between the home agent and the access terminal. Moreover, the method includes providing a second network access for the access terminal by a second connectivity node. For example, the embodiment is illustrated according to FIG. 2.

According to another embodiment, the present invention provides a method for a handoff process in a wireless communication network. The method includes providing an access terminal, the access terminal being configured to perform wireless IP communication. The method also includes providing a first network access for the access terminal by a first connectivity node and a first access node. The method further includes assigning a plurality of addresses for the access terminal, the plurality of address including a first address and a second address, the first address being associated with a first priority level, the second address being associated with a second priority level. Also, the method includes storing the plurality address by a home agent. The method additionally includes performing a handoff process for switching from the first connectivity node to a second connectivity node. The handoff process includes determining the first priority level and the second priority level by the home agent, the first priority level being higher than the second priority level. The process also includes performing a first binding update for the first address between the home agent and a first access node. The process further includes performing a second binding update for the second address between the home agent and the access terminal. The process additionally includes initiating a timer by the second connectivity node. The process also includes sending a handoff acknowledge message from the second connectivity node to the first connectivity node if a handoff confirm message is not received by the second connectivity node before an expiration of the timer. For example, the embodiment is illustrated according to FIGS. 2 and 3. The method may further include assigning a third address for the access terminal, the third address being associated with the second connectivity node.

According to yet another embodiment, the present invention provides a system for wireless communication. The system provides an access terminal, the access terminal being configured to perform wireless IP communication. The system additionally provides a first access node, the first access node being configured for providing a first wireless connection for the access terminal. The system additionally includes a first connectivity node for providing a first network access for the access terminal. The system further includes a home agent, the home agent being configured to store a plurality of addresses for the access terminal, the plurality of address including a first address and a second address, the first address being associated with a first priority level, the second address being associated with a second priority level. The access node is configured to initiate a handoff process for switching from the first connectivity node to a second connectivity node. The home agent is configured to determine the first priority level and the second priority level by the home agent, the first priority level being higher than the second priority level. The home agent is configured perform a first binding update for the first address with the first access node. The home agent is configured to perform a second binding update for the second address with the access terminal. The second connectivity node is configured to provide a second network access for the access terminal. For example, the embodiment is illustrated according to FIG. 2.

Many benefits are achieved by way of the present invention over conventional techniques. In certain embodiments, the present invention provides a process for performing handoff where two or more addresses are involved. More specifically, each of the addresses is associated with a priority level. A home agent, when performing binding updates, through different communication links and processes to ensure that handoff for communication links of real time applications (e.g., VoIP applications) is performed reliably and timely. Among other things, embodiments of the present application ensures the quality of services of various types of applications. In various embodiments, the binding updates for multiple addresses are performed using a single home agent, which allows for efficient and cost-effective implementation. In addition, various embodiments of the present invention may be implemented in conjunction of existing systems. There are other advantages and benefits as well.

What is claimed is:

1. A method for wireless communication, the method comprising:
providing an access terminal, the access terminal being configured to perform wireless IP communication;
providing a first wireless connection for the access terminal by a first access node;

providing a first network access for the access terminal by a first connectivity node;
obtaining a plurality of addresses for the access terminal, the plurality of addresses including a first address and a second address, the first address being associated with a first priority level, the second address being associated with a second priority level;
storing the plurality of addresses by a home agent;
initiating a handoff process for switching from the first connectivity node to a second connectivity node;
determining the first priority level and the second priority level by the home agent, the first priority level being higher than the second priority level;
performing a first binding update for the first address between the home agent and a first access node;
performing a second binding update for the second address between the home agent and the access terminal; and
providing a second network access for the access terminal by a second connectivity node.

2. The method of claim 1 wherein the plurality of addresses comprises care-of-addresses.

3. The method of claim 1 further comprising:
initiating a timer by the second connectivity node;
sending a handoff acknowledge message from the second connectivity node to the first connectivity node if a handoff confirm message is not received by the second connectivity node before an expiration of the timer.

4. The method of claim 1 further comprising performing authentication for the access terminal between the first connectivity node and an authentication server.

5. The method of claim 1 wherein the second connectivity node comprises a target packet data serving node (PDSN).

6. The method of claim 1 further comprising providing a second wireless connection for the access terminal by a second access node.

7. The method of claim 1 wherein the first connectivity comprises a serving packet data serving node (PDSN).

8. The method of claim 1 wherein the home agent comprises a binding cache.

9. The method of claim 1 wherein the obtaining a plurality of addresses comprises:
registering the first address at the home agent, the first address being associated with a proxy mobile internet protocol (PMIP);
registering the second address at the home agent, the second address being associated with a client mobile internet protocol (CMIP).

10. The method of claim 1 wherein the access terminal comprises a mobile station.

11. The method of claim 1 wherein the access mobile station is in compliance with the Mobile IP standard.

12. A method for a handoff process in a wireless communication network, the method comprising:
providing an access terminal, the access terminal being configured to perform wireless IP communication;
providing a first network access for the access terminal by a first connectivity node and a first access node;
assigning a plurality of addresses for the access terminal, the plurality of addresses including a first address and a second address, the first address being associated with a first priority level, the second address being associated with a second priority level;
storing the plurality of addresses by a home agent;
performing a handoff process for switching from the first connectivity node to a second connectivity node;
wherein the handoff process comprises:
determining the first priority level and the second priority level by the home agent, the first priority level being higher than the second priority level;
performing a first binding update for the first address between the home agent and a first access node;
performing a second binding update for the second address between the home agent and the access terminal;
initiating a timer by the second connectivity node;
sending a handoff acknowledge message from the second connectivity node to the first connectivity node if a handoff confirm message is not received by the second connectivity node before an expiration of the timer.

13. The method of claim 12 wherein the second address is associated with data communication.

14. The method of claim 12 wherein the performing a second binding update for the second address comprises indicating a priority associated with the second binding update.

15. The method of claim 12 further comprising assigning a third address for the access terminal, the third address being associated with the second connectivity node.

16. A system for wireless communication, the system comprises:
an access terminal, the access terminal being configured to perform wireless IP communication;
a first access node, the first access node being configured for providing a first wireless connection for the access terminal;
a first connectivity node for providing a first network access for the access terminal;
a home agent, the home agent being configured to store a plurality of addresses for the access terminal, the plurality of addresses including a first address and a second address, the first address being associated with a first priority level, the second address being associated with a second priority level;
wherein:
the access node is configured to initiate a handoff process for switching from the first connectivity node to a second connectivity node;
the home agent is configured to determine the first priority level and the second priority level by the home agent, the first priority level being higher than the second priority level;
the home agent is configured perform a first binding update for the first address with the first access node;
the home agent is configured to perform a second binding update for the second address with the access terminal;
the second connectivity node is configured to provide a second network access for the access terminal.

17. The system of claim 16 wherein the home agent comprises a binding cache.

18. The system of claim 16 wherein the first connectivity node comprises a packet data serving node (PDSN).

19. The system of claim 16 wherein the first access node comprises a base station.

20. The system of claim 16 is in compliance with a Mobile IP standard.

21. The system of claim 16 wherein the home agent comprises a base station.

* * * * *